US009648552B2

(12) United States Patent
Fischer et al.

(10) Patent No.: US 9,648,552 B2
(45) Date of Patent: May 9, 2017

(54) WIRELESS NETWORK SCANNING STRATEGIES

(71) Applicant: Broadcom Corporation, Irvine, CA (US)

(72) Inventors: Matthew James Fischer, Mountain View, CA (US); Nelson Ray Sollenberger, St. Thomas, PA (US); Vinko Erceg, Cardiff, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 159 days.

(21) Appl. No.: 14/681,758

(22) Filed: Apr. 8, 2015

(65) Prior Publication Data

US 2015/0296446 A1    Oct. 15, 2015

Related U.S. Application Data

(60) Provisional application No. 61/979,644, filed on Apr. 15, 2014.

(51) Int. Cl.
*H04W 48/16* (2009.01)
*H04W 52/02* (2009.01)

(52) U.S. Cl.
CPC ....... *H04W 48/16* (2013.01); *H04W 52/0254* (2013.01)

(58) Field of Classification Search
CPC  G06F 11/00; H04Q 7/00; H04Q 7/20; H04W 48/16; H04W 52/0296
See application file for complete search history.

(56) References Cited

U.S. PATENT DOCUMENTS

| 6,801,777 B2 | 10/2004 | Rusch |
| 7,706,369 B2 | 4/2010 | Roese et al. |
| 2004/0259546 A1 | 12/2004 | Balachandran et al. |
| 2007/0115951 A1 | 5/2007 | Karaoguz et al. |
| 2010/0091657 A1* | 4/2010 | Tsfaty ............... H04W 52/0296 370/241 |
| 2014/0056192 A1 | 2/2014 | Meylan et al. |

FOREIGN PATENT DOCUMENTS

WO    WO 2014/056173 A1    4/2014

OTHER PUBLICATIONS

European Search Report, App. No. 15001029.6 dated Sep. 4, 2015.

* cited by examiner

*Primary Examiner* — Andrew Lai
*Assistant Examiner* — Leon Andrews
(74) *Attorney, Agent, or Firm* — Foley & Lardner LLP

(57) ABSTRACT

A device may use positioning information to increase the efficiency a wireless local area network (WLAN) scanning process. To determine the presence of WLANs within range, a device may determine its own location. For example, the device may determine its own location using a satellite-based navigation system. The device may then determine a wireless scanning strategy based on the determined location. The determination may be further based on connection parameters, such as, channel information, network capabilities, and/or other connection parameters.

20 Claims, 6 Drawing Sheets

US 9,648,552 B2

WIRELESS NETWORK SCANNING STRATEGIES

PRIORITY CLAIM

This application claims priority to provisional application Ser. No. 61/979,644, filed Apr. 15, 2014, which is entirely incorporated by reference.

TECHNICAL FIELD

This disclosure relates beacon reception and provisioning in wireless local area networks.

BACKGROUND

Rapid advances in electronics and communication technologies, driven by immense customer demand, have resulted in the widespread adoption of mobile communication devices. This widespread adoption has increased competition for limited bandwidth resources. Advances in efficient usage of such limited resources may reduce congestion and improve consumer experience. Further, reductions in extraneous broadcasting may help to conserve power resources and increase mobile device battery life.

DETAILED DESCRIPTION

The following disclosure relates to scanning performed by a device, e.g. scanning to locate resources such as wireless local area networks (WLANs) within range of the device. In some cases, a device may actively or passively scan multiple channels within a number of wireless bands to determine the availability of networks. In some cases, scanning over these channels may consume power resources thereby depleting a limited energy supply of the device and also create overhead in the channels, which may reduce the available bandwidth for data transmission.

In various implementations, a device may use positioning information to increase the efficiency of the WLAN scanning process. To determine the presence of resources such as WLANs within range, a device may determine its own location and access a stored database of WLAN networks within an area. The database may include connection parameters, such as channel information, beacon timing and/or other connection parameters to support efficient identification of WLANs covering a particular position, including the position where the device is located. A device may access the database via an additional data connection, such as a cellular network connection. Additionally or alternatively, the database or a portion thereof may be stored locally on the device. For example, a device may download parameters for WLANs within a determined radius of the current position of the device or for a set of WLANs in a direction of travel of the device. In some cases, a group of associated WLANs may be included in a database, such as a group of WLANs associated with a subscription service.

In some implementations, the timing for beacon provisioning by access points (APs) may be position specific. For example, the position of an AP may be used as an input to a hash function. The hash function output may be used to determine the timing for a beacon from the AP. A device connecting to the AP may then use the hash function output and the current location of the device to determine when to expect the beacon for a given location.

In various implementations, the beacon timing interval for APs may be set to a common value based on a predetermined time source. The time source may be shared by any number of devices and may be a global time source with respect to those devices that share the time source. A device may then listen for beacons at the common time value. For example, a group of associated APs may have common beacon timing intervals, e.g., a group of APs belonging to a subscription service or other group of APs.

Figure 1:
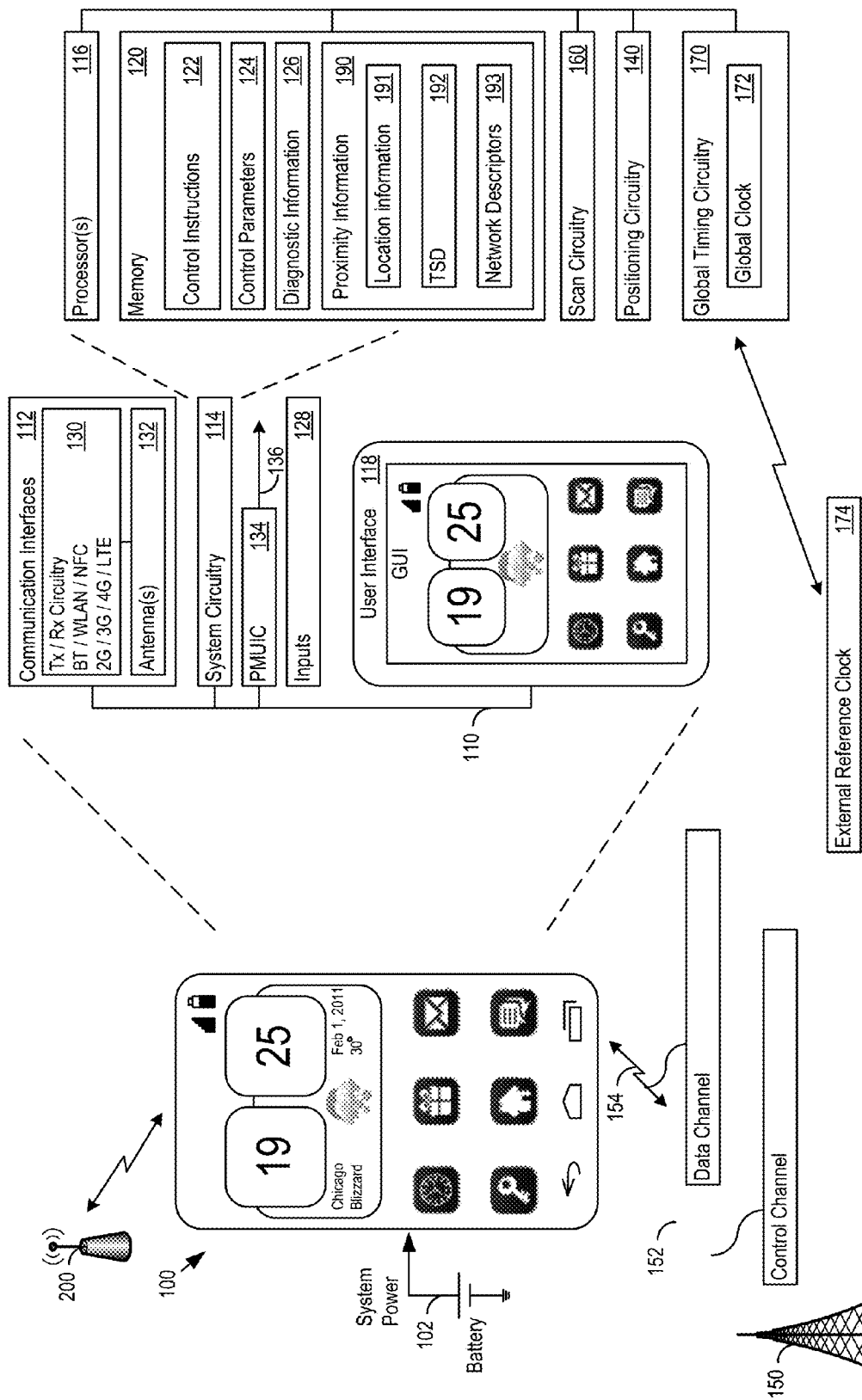
FIG. 1 shows an example of a device.

FIG. 1 shows an example of a device 100. The device 100 is a smartphone in this example, but the device may be any electronic device. The techniques described below regarding scanning for available WLANs may be used with a wide array of devices, such as, tablets, laptops, phablets, cameras, or other WLAN capable devices. Accordingly, the smartphone example described below provides just one example context for explaining the scanning and beacon provisioning techniques.

As one example, device may be a 2G, 3G, or 4G/LTE cellular phone capable of making and receiving wireless phone calls, and transmitting and receiving data using 802.11 a/b/g/n/ac/ad ("WiFi"), Bluetooth (BT), Near Field Communications (NFC), or any other type of wireless technology. The device may also be a smartphone that, in addition to making and receiving phone calls, runs any number or type of applications. The device may, however, be virtually any device that transmits and receives information, including as additional examples a driver assistance module in a vehicle, an emergency transponder, a pager, a satellite television receiver, a networked stereo receiver, a computer system, music player, or virtually any other device.

FIG. 1 shows an example of the device 100 in communication with a network controller 150, such as an enhanced Node B (eNB) or other base station. The network controller 150 and device 100 establish communication channels such as the control channel 152 and the data channel 154, and exchange data. In this example, the device 100 supports one or more Subscriber Identity Modules (SIMs). Electrical and physical interfaces may connect the user equipment hardware, for example, through the system bus 110.

The device 100 includes communication interfaces 112, system circuitry 114, and a user interface 118. The system circuitry 114 may implement any combination of hardware, software, firmware, or other logic. The system circuitry 114 may be implemented, for example, with one or more systems on a chip (SoC), application specific integrated circuits (ASIC), discrete analog and digital circuits, and other circuitry. The system circuitry 114 is part of the implementation of any desired functionality in the device 100. In that regard, the system circuitry 114 may implement logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118. The user interface 118 and the inputs 128 may include a graphical user interface, touch sensitive display, voice or facial recognition inputs, buttons, switches, speakers and other user interface elements. Additional examples of the inputs 128 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system circuitry 114 may include one or more processors 116 and memories 120. The memory 120 stores, for example, control instructions 122 that the processor 116 executes to carry out desired functionality for the device 100. The control parameters 124 provide and specify configuration and operating options for the control instructions 122. The memory 120 may also store any BT, WiFi, 3G, or other data 126 that the device 100 will send, or has received, through the communication interfaces 112. The memory 120 may further include listings, databases, or other data structures containing proximity information for WLAN or other wireless networks. The proximity information 190 may include data to support link establishment with WLAN networks, such as location information 191 for the WLAN network, timing synchronization data (TSD) 192 (e.g., timing synchronization function (TSF) data, connectivity frame timing data, global timing offsets, or other timing data) network descriptors 193 (e.g., service set identifiers, service set availability, channel usage, network capabilities, or other descriptors), or other data.

The system circuitry 114 may further include scan circuitry 160 to implement the network scanning techniques described below. The scan circuitry 160 may coordinate the resources available in the memory 120 with the wireless connectivity resources of the communication interface 112. The scan circuitry may implement virtually any combination of hardware, software, firmware, or other logic to effect this coordination. In an example scenario, the scan circuitry 160 may cause the communication interface to tune an antenna to a specific channel during a predicted interval during which a connectivity frame may be sent by an AP 200. Therefore, the scan circuitry 160 may be used to reduce the time spent listening to channels relative to blind scanning, e.g., scanning channels without a priori information on connectivity frame timing, channel use, or other WLAN connectivity information. For example, the scan circuitry may predict an interval of 1-5 ms in length. The antenna may be tuned during this interval which may be less than a 50-150 ms interval associated with blind scanning. However, the interval discussed here is merely exemplary, the predicted interval may be virtually any length In some cases, the device 100 may include positioning circuitry 140, such as satellite navigation circuitry (e.g., GPS, GLONASS, GALLIEO), network based positioning logic (e.g., internet protocol (IP) based position estimation, WLAN based position estimation, cellular tower association), radio triangulation circuitry, or other circuitry for determining device location.

The device may include global timing circuitry 170 that may access and maintain a global clock 172 which is synchronized with an external reference clock 174. The synchronization may occur over virtually any of the communication interfaces 112 (e.g., referencing a standardized time internet resource (e.g., National Institute of Standards (NIST) web servers), cellular network time resources (e.g., pilot synchronization signals), or other network based time determinations. In some cases, the synchronization may occur over other systems within the device. For example, a global clock may be derived from satellite navigation signals or timing reference radio signals.

The device 100 may include a power management unit integrated circuit (PMUIC) 134. In a complex device like a smartphone, the PMUIC 134 may be responsible for generating as many as thirty (30) different power supply rails 136 for the circuitry in the device 100. In some cases, the device 100 may be powered by via an energy source 102, such as a battery and/or other energy source.

In the communication interfaces 112, Radio Frequency (RF) transmit (Tx) and receive (Rx) circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interface 112 may include transceivers that support transmission and reception under the 2G, 3G, BT, WiFi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies. The device 100 may communicate via interface 112 with cellular base stations 150 over data 154 and/or control channels 152. The device 100 may communicate with an access point 200 via interface 112.

Figure 2:
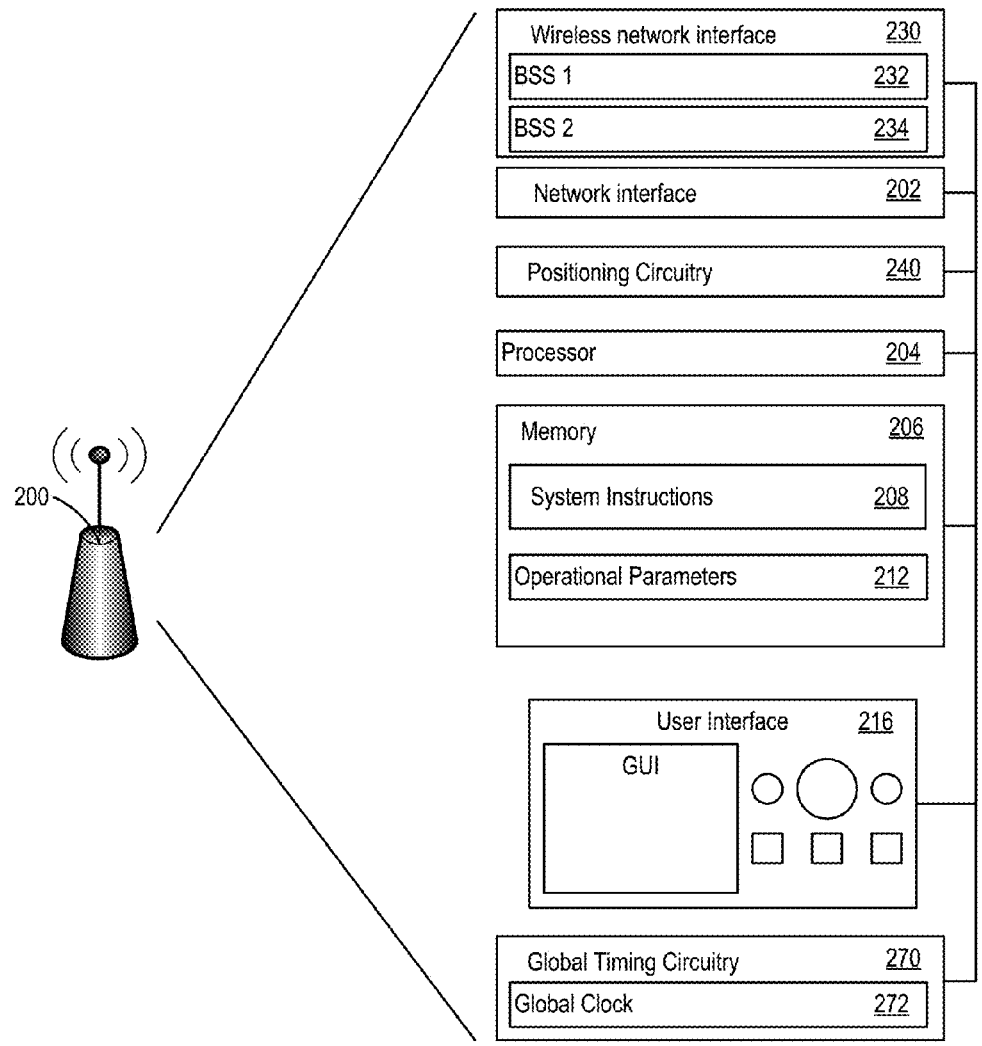
FIG. 2 shows an example wireless network access point (AP).

FIG. 2 shows an example wireless network access point (AP) 200. The example AP 200 may facilitate network connectivity with multiple devices and supply multiple basic service sets (BSSs) 232, 234. The BSSs may include various groupings of capabilities which share one or more resources. For example a first BSS may support connectivity using a first frequency band and a second BSS may support connectivity at a second frequency band. The BSS divisions may be physically identifiable characters such as antenna or frequency divisions or logical divisions such as coding, frequency hopping scheme, modulation scheme, physical addressing or resource block based divisions.

The AP 200 may include a network interface 202 to support network communications over multiple protocols. The network interface 202 may support backhaul connectivity for the AP, which the AP 200 may share over wireless interface 230. The wireless interface 230 may support the BSSs 232, 234. The AP may further include one or more processors 204 to support execution of applications and operating systems, and to govern operation of the AP 200. The AP 200 may include memory 206 for execution support and storage of system instructions 208 and operational parameters 212. The memory 206 may further include location information, wireless network descriptors for the AP 200 from which to implement beaconing interval controls.

In some cases, the AP may further include global timing circuitry 270, which may provide the AP with a global clock 272 against which the AP 200 may reference the AP's internal timings. The global timing circuitry 270 may access network connected time sources to receive the global time. Additionally or alternatively, the global timing circuitry 270 may use any or the non-network sources discussed above with respect to global timing circuitry 170. However, the AP may report real-time internal timing to an external database which may reference received reports of the AP's 200 internal timings against a global clock to determine the global clock baseline.

The AP 200 may further include positioning circuitry 240 from which to determine the AP's 200 location. However, in some implementations, the AP 200 may be provided with location information by an operator as part of AP configuration and setup, over the network based on a survey of wireless network locations, or in other manners.

The AP 200 may include timing function computation logic 290 to compute a timing function (e.g., a hash function or other function) using the AP's determined location as an input. The resultant hash output may be used by the AP 200 to determine a timing offset for sending connectivity frames. The connectivity frames may include WLAN beacons, supplementary beacons, informational data frames or other signals to facilitate link establishment with the AP 200.

The AP 200 may include a user interface 216 to allow for user operation of the device.

In some cases the scan circuitry 160 may generate a list of APs with which to potentially associate in the future. If the device 100 is not already associated, the device may enter a roaming mode. In the roaming mode the scan circuitry 160 may scan across multiple channels over a number of bands to determine available WLAN networks. In a WLAN network, an associated group of devices and APs may form a basic service set (BSS). In some cases, scanning to obtain a list of APs on accessible channels may take a considerable amount of time. For example, a band may include 20-30 channels (or other numbers of channels) and a device may scan, for example, one, two, four, or more bands. In some cases a beacon interval may be up to 100 ms or more. To determine the APs on the channels a scan circuitry 160 may scan channels for up to 100 ms or more per channel. Additionally or alternatively, a scan circuitry 160 may perform an active scan. In some cases, active scans may generate many responses from local BSSs. In some cases, this chain of responses may generate wireless traffic in amounts likely to interfere with other communications and may reduce system throughput. In some high density usage areas, active scanning performed by one or more devices may generate an unusably large number of responses from one or more APs that may collide with one another. Additionally or alternatively, active scans may use increased energy resources and shorten battery life of mobile devices.

Scan circuitry 160 that has information on when to expect a beacon may reduce the time used to scan channels. Various techniques for providing beacons at predictable intervals are discussed below.

Figure 3:
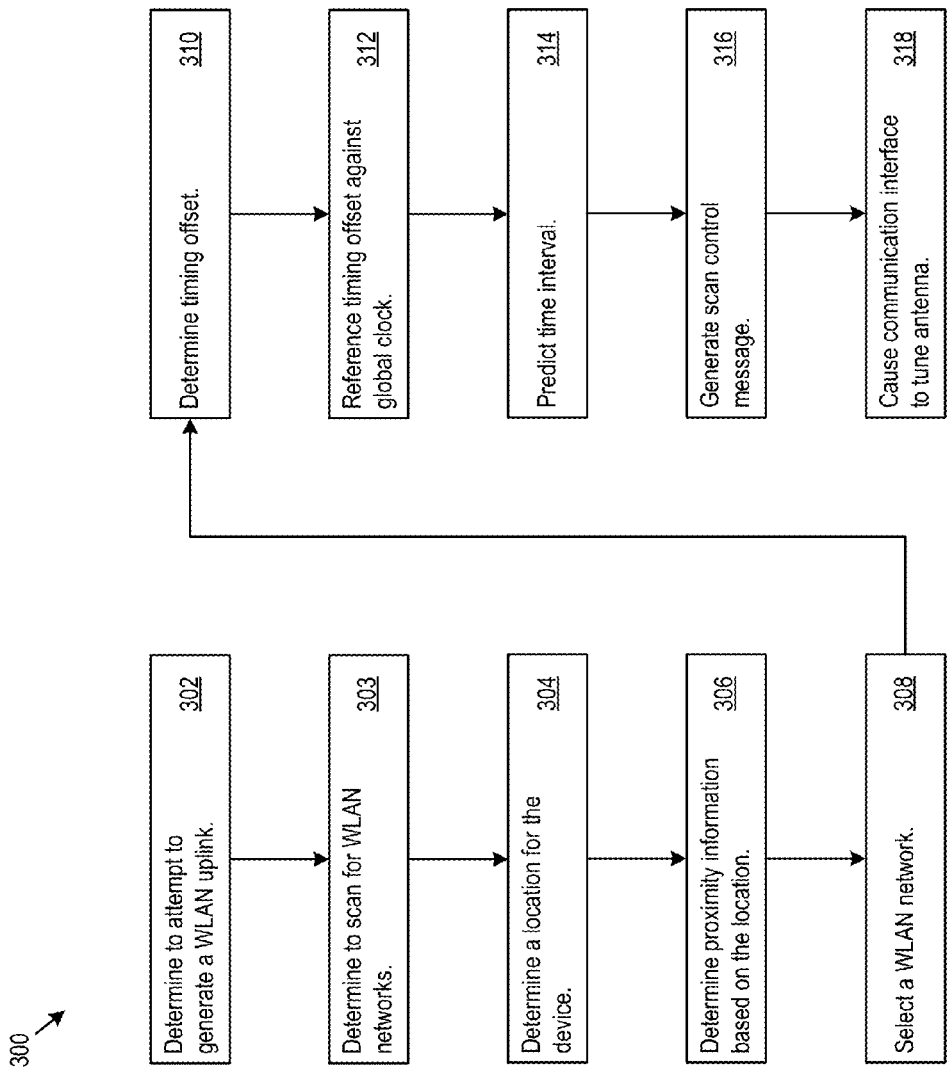
FIG. 3 shows example logic for determining connectivity frame timing.

FIG. 3 shows example logic 300 for determining connectivity frame timing. The example logic 300 may be implemented on scan circuitry 160. The logic 300 may determine to attempt to generate a WLAN uplink (302). The logic may determine to scan for WLAN networks to determine which WLAN networks are available for connection (303). The logic 300 may determine a location for a device (304). For example, the logic may access location information use positioning circuitry 140. The logic 300 may determine proximity information for WLAN networks based on the determined location information (306). For example, the logic 300 may access a location indexed database of proximity information for WLAN networks and determine which networks are in proximity to the device 100. Additionally or alternatively, local BSSs or other local data sources may provide data on other local BSSs to which the logic 300 may determine to connect. The proximity information for surrounding BSSs may be included in connectivity frames a first BSS. The device may receive information on beacon timing for, e.g., local BSSs from, e.g., a database, responsive to the position information. For example, the device may access the database through another network connection different from the one the device seeks to establish, such as cellular or a WLAN, e.g., an existing association.

In some cases, the database may be area specific to allow for reduced database size. Additionally or alternatively, the database may be accessed in area specific portions. For example, the selected portion of the database may be based on estimated next location of the WLAN device, e.g., based on a current direction and/or rate of travel of the device. Additionally or alternatively, a determined radius from the current location of the device 100 may be used to determine the portion.

The logic 300 may use the proximity information on the local BSSs to determine a scanning strategy, e.g., when and/or on what channels to listen for beacons. In various implementations, the database may include a list of BSSs with information, such as, channel of operation, SSID, TSF values such as offsets from the local TSF, a relation of the TSF to a global clock, e.g. a time standard such as that from the NIST or a time from a cellular network, or GPS satellite, or other global clock. The local clock of a BSS may be based on an arbitrary time point such as total up time). The database may also include other characteristics and capabilities of an AP that may be the owner of a BSS.

To determine the strategy, the logic may select a WLAN with which to initiate a communication link (308). The logic may determine a timing offset and a channel of operation for the WLAN from the proximity information (310). The logic may reference the timing offset against a global clock (312). Based on the global clock and the timing offset, the logic may predict an interval in which the selected WLAN may transmit a connectivity frame (314). Based on the prediction, the logic 300 may generate a scan control message for the communication interface 112 of the device 100 (316). Via the scan control message, the logic 300 may cause the communication interface 112 to tune an antenna to the channel of operation during the predicted interval (318).

For a device that is not currently associated with a WLAN, the global clock to TSF relationship may facilitate prediction of the occurrence of connectivity frames, e.g., beacons, supplement frames or other frames. This relationship allows for quick scan time(s) when searching for beacons.

Therefore, it may be advantageous to align TSF values of participating BSSs with a global clock. For example, a BSS may access a global clock via an internet connection and determine a relation to the TSF of the BSS. Additionally or alternatively, the access of the global clock may be done at various intervals to correct for error in the local clock of the BSS. For example, updates may be performed at 30 second intervals to ensure the error in the TSF value relationship is less than 1 ms. However, other update intervals, such as aperiodic or trigger intervals, may be used.

If AP does not have access to the global clock, then some entity that has access to both global clock and that AP's TSF must provide periodic updates of offset value for that BSS into the database to correct for drift.

Additionally or alternatively, a device can eliminate some future association candidates based on the database information, e.g., based on the location and capabilities of the BSS. Further, evaluations of candidate APs can be made by examining link quality for the remaining candidate APs. A device can align with the TSF of neighboring AP to listen for a beacon or other frame in order to estimate link quality.

In some implementations, a device may send a probe request. The ensuing exchange following the probe request may be used to aid in link quality determination. Similarly other allowed frame exchanges, e.g., public action exchanges or other frame exchanges, may be used in link quality determination.

Figure 4:
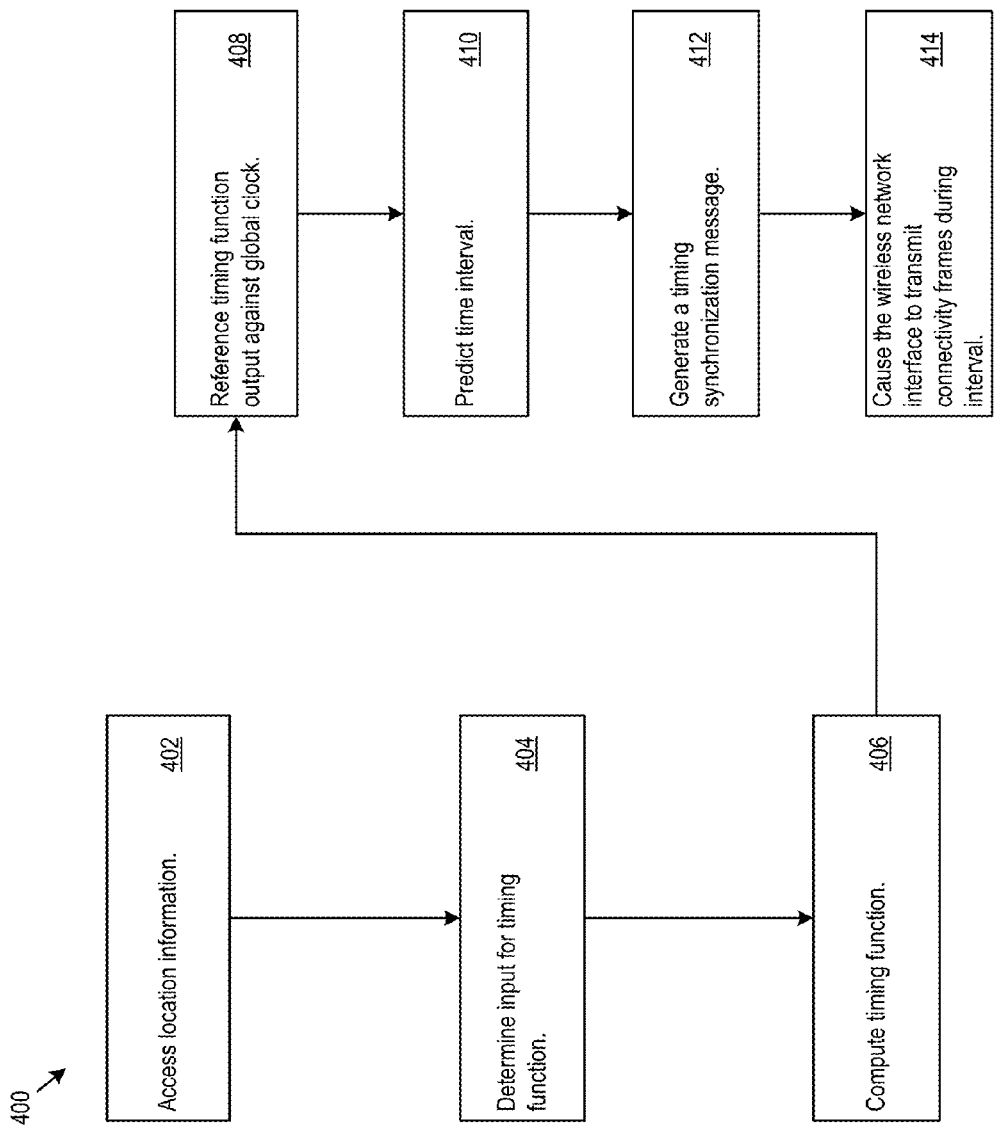
FIG. 4 shows example logic for determining location-based connectivity frame timing for an AP.

FIG. 4 shows example logic 400 for determining location-based connectivity frame timing for an AP. The example logic 400 may be implemented on circuitry. An AP 200 may access location information (402). For example, the position information may be input by an operator of the AP, provided by an associated device with positioning circuitry (e.g., a GPS equipped smartphone connected to the BSS, or other device), provided by positioning circuitry 280 on the AP, or provided by another positioning information source.

The AP may determine an input for a timing function based on the location information (404). For example, the logic 400 may select one or more bits from the location information to serve as the input. The input may be further based on other information. For example, channel of operation for the AP 200 may be used as an additional portion of the input. The logic 400 may compute the timing function output using the determined input (406). The logic may reference the output against a global clock (408). Based on the output of the timing function and the global clock, the logic 400 may determine an interval in which the AP 200 may transmit connectivity frames (410). The logic 400 may generate a timing synchronization message for the wireless network interface 230 that indicates the determined interval (412).

Figure 5:
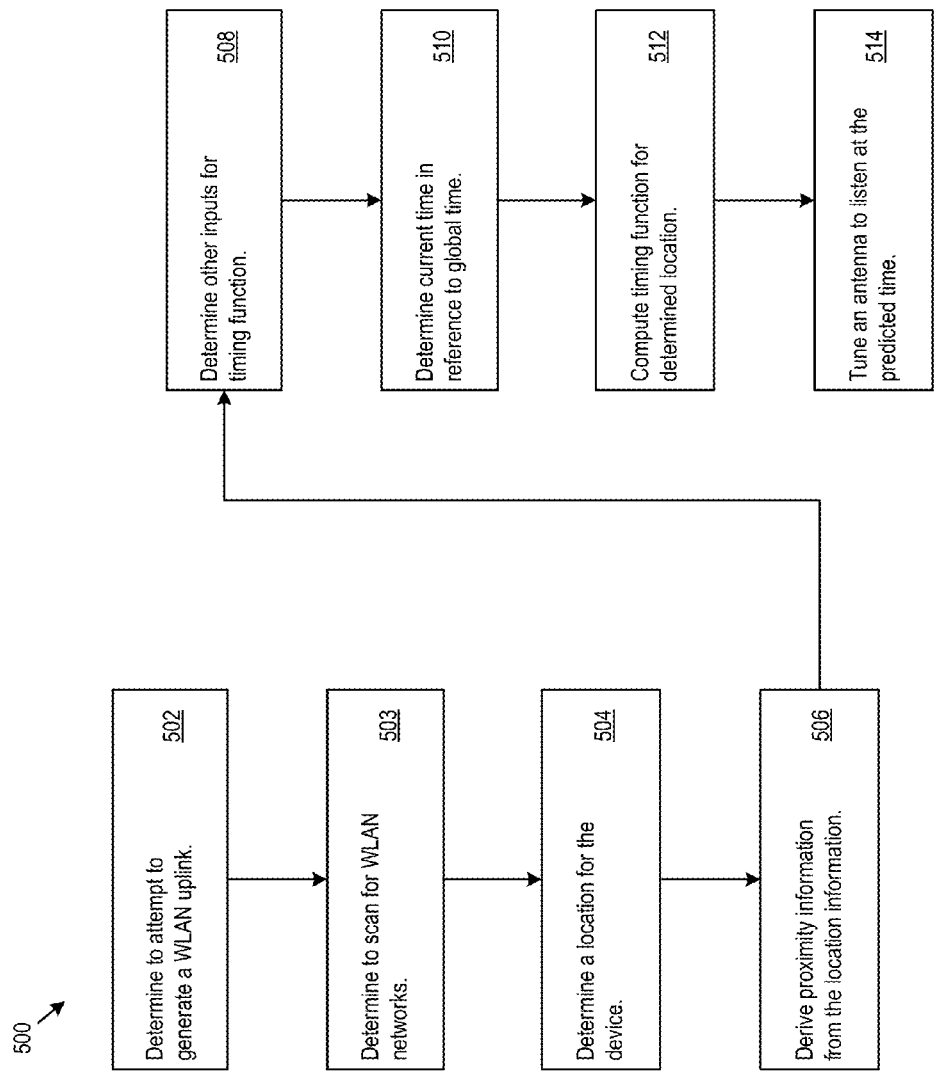
FIG. 5 shows example logic for frame timing prediction.

The logic 400 may cause the wireless network interface to transmit connectivity frames during the determined interval via the timing synchronization message (414). For example, a beaconing device, such as an AP 200, may generate supplemental frame transmissions at specific times that are based on a hash function output. In some implementations, the hash function may use inputs, such as, a location of the AP computed to a specific resolution, a common global time reference to a specific resolution, a channel of operation, and/or other AP parameters. The supplemental frames, based on the timing function, can be beacons or probe responses or other frames that help to identify the existence of the device or BSS The device 100 may use the same timing function to predict the timing of the connectivity frames from the AP 200. FIG. 5 shows example logic 500 for frame timing prediction. The logic 500 may determine to attempt to generate a WLAN uplink (502). The logic may determine to scan for WLAN networks to determine which WLAN networks are available for connection (503). The logic 500 may determine a location for the device (504). From the location information, the logic 500 may derive proximity information (506). For example, the logic may determine an identifier for a region that includes the device's location. The region may include defined tiles over the surface of some geographical area.

In some cases, other inputs such an operating channel may be provided to the timing function by the logic 500 (508). Thus, particular channels may be assigned particular slots for a geographical area. In some cases, the hash generated timings may cascade depending on channel of operation, such that a device 100 may scan a group of channels by tuning to channels in sequence. For example, a scan of a range of channels may occur over a single beacon interval, e.g., one channel per 5 ms interval and 20 channels in a 100 ms interval. In another case, the hash function may determine a base time for a region and then the channels may have additional offset of (N milliseconds X channel number) this may produce the sequential timing for single beacon interval scans of many channels. The device 100 may determine the current time based on the common global time (510). The device 100 may compute the timing function to determine timing of APs in the area (512). The device may tune an antenna to the channel at the predicted time, or at some time before the predicted time, to hear the connectivity frames, if present (514).

In some cases, multiple APs in the same area within a given resolution will calculate the same beacon timing function value and may transmit their supplemental frames at the same time.

In some implementations, a timing offset, such as one or more of the least significant bits of the determined location information, may be used to provide offset of timing of transmissions within a window. These bits need not be included in the beacon timing function calculation. Additionally or alternatively, randomization of beacon timing within a determined window may be used to avoid collisions. In some implementations, most significant location bits (e.g., coarse location information) may be used by the logic 500 as input to the timing function and least significant bits (fine location information) may be used for randomization or fine tune timing.

In some cases, a device may connect to a first AP and then request proximity data on other APs within the region or in the area from the first AP. Thus, the device may skip calculating timing functions for other APs or skip tuning an antenna to listen for other APs to determine what WLAN connections are available.

A device 100 on a boundary for the timing function may calculate the beacon timing function for the adjacent regions. The device 100 may predict connectivity frames from APs in the multiple adjacent regions. Additionally or alternatively, an AP in a boundary region may provide connectivity frames consistent with the multiple neighboring locations. However, in some cases, calculation of timing functions for adjacent regions may be performed by a device that is outside of border region. For example, a timing function for a neighboring region may be calculated by a device in or near the center of another region where no overlap is present. In some cases, calculating timing for neighboring regions may facilitate a shorter interruption in data connectivity when compared to situations where neighboring timing functions are not calculated. In some implementations, the resources used in timing function calculation may be weighed against the benefits from pre-calculating neighboring timing functions.

Figure 6:
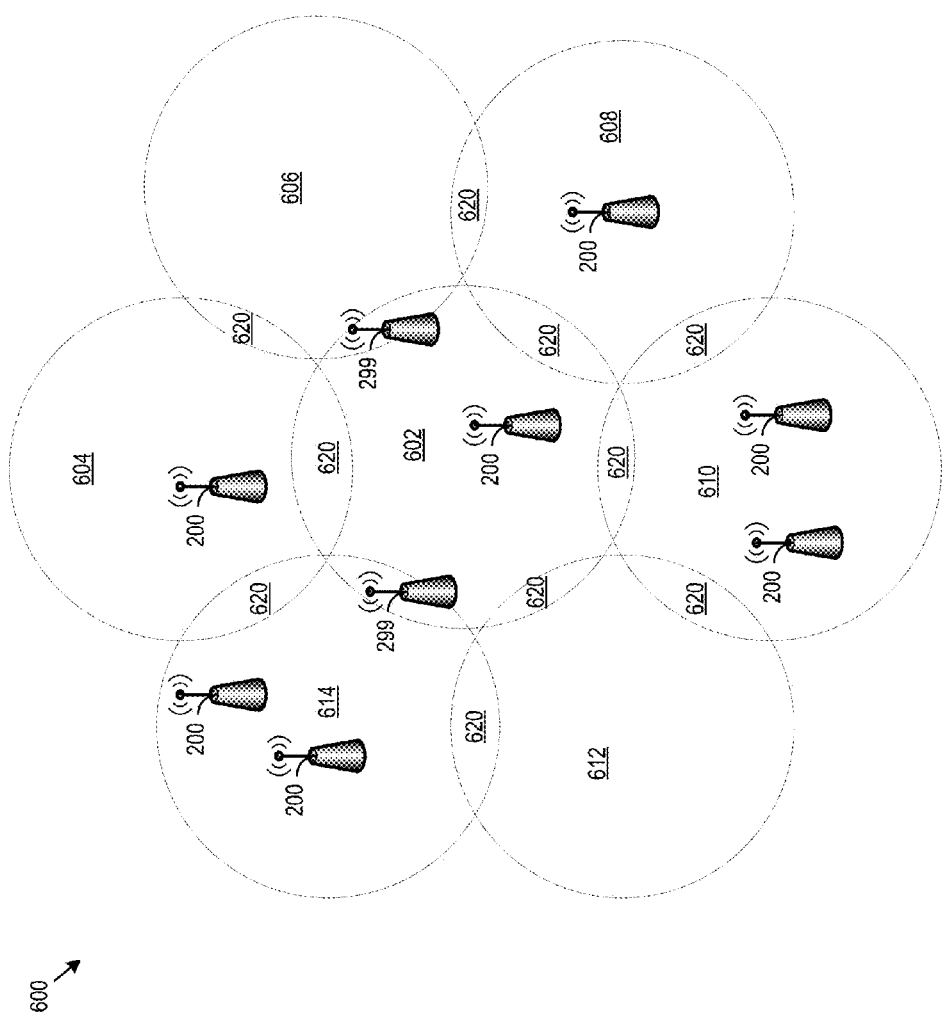
FIG. 6 shows an example timing function environment.

FIG. 6 shows an example timing function environment 600. The different timing regions 602, 604, 606, 608, 610, 612, 614 have overlapping border regions 620 and have different assigned timing offsets. APs 200 may reside in any of the regions. Some APs 299 may reside in border regions. Border region APs 299 may produce connectivity frames for any or all regions in which they reside. No APs 200 may be present in some regions, while other regions may have multiple APs 200 When a device is located in the border regions 620, the logic 500 may calculate timing functions for any timing regions in which the device is situated.

The timing regions are not necessarily evenly distributed over a given geographic area. The timing regions may be more densely spaced in regions with more WLAN networks or other interference sources. The timing regions may be less densely spaced in regions with fewer WLAN networks or other interference sources. Further, virtually any shape may be used for timing regions. For example, hexagonal or square regions may be used. In some cases, the shape of the regions may be determined in part by the topology of the region or structures present.

A device 100 that discovers a beacon timing function based transmitter can then query that transmitter for information on other local BSSs. In some cases, not all beaconing devices may supply beacons based on the beacon timing function. Additionally or alternatively, various groups of APs may use differing beacon timing functions. For example, a group of APs associated with a first subscription service may use a first beacon timing function and another group of APs associated with a second subscription service may use a second beacon timing function.

In various implementations, the beaconing timing for group of BSSs with the same beacon interval parameter could be the same. For example, the group of BSSs may have a common target beacon transmission time (TBTT). This beacon timing may be based on a global clock. A device 100 scanning for a BSS in the group of BSSs may predict a future beacon based on the common timing and the global clock.

In some implementations, a hash function based on location, SSID, channel, media access control (MAC) address, and/or other parameters may be used to set offsets from the common timing. These offsets may be used to avoid collisions within a common timing BSS group. In some cases, the offsets may determine a position within a window of the common beacon timing.

In some implementations, the BSSs in a timing group may use the same interval. For example a value of 100.352 ms may be commonly used by APs.

In some implementations, a group of BSSs using a single global-clock based timing may share common characteristics to allow for their identification by a connecting device 100. For example, the group of BSSs may share a common SSID value or have SSID values assigned in a similar or predictable manner, e.g. using a group number and a station number within that group or other deterministic naming process. For example, a group of BSSs with SSID=ATT may use a GPS clock value for their base TTBT value. Additionally or alternatively, defined intervals other than 100.352 ms may be used. Other factors for identification of BSS timing groups may include common operator/owners of the group of BSSs, the availability of a wide area network (WAN, e.g. internet, connection), the type of WAN connection, (e.g. cable, fiber, digital subscriber line (DSL), and/or other WAN connection type), and/or other factors.

The initial setup of the timing within the BSS timing group may be achieved through an initial configuration process of the APs or other devices within the BSSs. In various implementations, the initial configuration may occur through a direct setup process or remotely over a network, e.g. cellular or WLAN delivery.

Sources of global time references may include GPS signals and/or other satellite-based navigation signals, NIST shortwave radio signals (e.g. station WWV), time data from cellular networks, subcarrier signals from broadcast networks, and/or other global time sources.

In some case, an AP or other BSS owner may not have direct access to a source of global time. In some implementations, a device or AP that has direct access to a source of global time may pass the global time information to a second device. For example, an AP that is receiving a GPS signal may have access to global time information. The AP may pass the global time information to a second AP, e.g. through an ad hoc WLAN connection. However, other methods of information transfer may be used.

In some cases, multiple devices capable of WLAN connectivity may have the same course of travel. For example, such devices may be traveling within the same vehicle or carried by the same operator. For example, smartphones, laptops, tablets, automotive sensors, drones, augmented reality devices, wearable sensors, fitness trackers, Internet of Things (IoT) type sensors, or other mobile devices and sensors. In such cases, scanning technique planning may be able to supplant active scanning which may lead to an increase flood of responses in proportion to the increased number of devices travelling together. In such cases, a first device may aid a second in determining a scan strategy. For example, the second device may establish a WLAN connection to the first device and access a database of WLAN networks or pre-planned scanning strategy stored on the first device. The second device may access the first device before initiating a scan.

Additionally or alternatively, the first device may transmit a frame that includes proximity data at a set interval (e.g., based on common timing between devices) that the second device may decode and use to determine a scanning strategy. Additionally or alternatively, the frame transmitted by the first device may include a pre-planned scanning strategy.

In some cases, the first and second devices may communicate on a secondary protocol. For example, proximity data may be transferred over a Bluetooth link between the devices. In an example scenario, a smartphone with a cellular data connection may access WLAN proximity information over the cellular data connection. A WLAN-capable wearable sensor with a Bluetooth connection to the smartphone may access the proximity data on the smartphone and use the proximity data to determine a scanning strategy.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
   a wireless communication interface comprising an antenna, the wireless communication interface configured to:
   tune a receiver connected to the antenna to a channel and receive a frame transmitted from an access point of a wireless local area network (WLAN); and
   responsive to the frame, initiate a first communication link with the WLAN; and
   scan circuitry configured to:
   determine proximity information for the WLAN;
   responsive to the proximity information, determine a timing offset for the WLAN;
   responsive to referencing the timing offset against a global clock perform a prediction of a transmission time for the frame from the access point of the WLAN; and
   responsive to the prediction, cause the wireless communication interface to tune the receiver to the channel during the transmission time.

2. The device of claim 1, wherein the scan circuitry is configured to access a WLAN database to determine the proximity information, the database comprising location information for the WLAN.

3. The device of claim 2, wherein the scan circuitry is configured to access the WLAN database via a second communication link established prior to the first communication link.

4. The device of claim 3, wherein the second communication link comprises a cellular data communication link.

5. The device of claim 3, wherein the second communication link comprises a link with another WLAN.

6. The device of claim 4, wherein the global clock is derived from the cellular data communication link.

7. The device of claim 1, wherein the proximity information comprises location information for the device, travel direction information for the device, or both.

8. The device of claim 1, wherein:
   the WLAN comprises one of multiple WLANs using a single timing offset and a single descriptor; and
   the scanning circuitry is configured to:
   generate a confirmation that the WLAN uses the single descriptor after the wireless communication interface receives the frame; and
   responsive to the confirmation, cause the wireless communication interface to initiate the first communication link with the WLAN.

9. The device of claim 1, wherein the scanning circuitry is configured to compute a hash function with an input comprising the proximity information to determine the timing offset.

10. The device of claim 9, wherein the access point is configured to compute the hash function with the same input to send the frame at the transmission time.

11. The device of claim 9, wherein the scanning circuitry is configured to:
    determine that the device is positioned within a border region; and
    responsive to the border region, determine second proximity information of a second WLAN network;
    compute the hash function with another input comprising the second proximity information to determine a second timing offset; and
    reference the second timing offset against a global clock to perform a second prediction of a second transmission time for a frame from an access point of the second WLAN; and
    responsive to the second prediction, cause the wireless communication interface to tune the receiver to a second channel during the second transmission time.

12. The device of claim 9, further comprising positioning circuitry configured to:
    generate multiple position bits based on a location of the device; and
    the proximity information comprises a first bit of the multiple position bits.

13. The device of claim 12, wherein:
    a second bit of the multiple position bits comprises a randomization bit for randomizing the timing offset; and
    the scanning circuitry is configured to omit the second bit from the input to the hash function.

14. The device of claim 13, wherein the first bit comprises a most significant bit of the multiple position bits and the second bit comprises a least significant bit of the multiple position bits.

15. A method comprising:
    determining proximity information for a wireless local area network (WLAN);
    responsive to the proximity information, determining a timing offset for the WLAN;
    responsive to referencing the timing offset against a global clock, performing a prediction of a transmission time for a frame from an access point of the WLAN;
    responsive to the prediction, tuning a receiver to a selected channel during the transmission time;
    receiving the frame transmitted from the access point of the WLAN; and
    initiating a first wireless communication link with the WLAN.

16. The method of claim 15, further comprising transmitting the proximity information to a device over a second communication wireless link to facilitate a second prediction of a second transmission time at the device.

17. The method of claim 15, wherein determining the proximity information comprises accessing a WLAN database comprising location information for the WLAN.

18. The method of claim 17, wherein accessing the WLAN database comprises accessing the WLAN database via a cellular communication link established prior to initiating a WLAN communication link with the WLAN network.

19. A device comprising:
a wireless communication interface comprising a receiver, the wireless communication interface configured to:
tune the receiver to a channel to receive a frame transmitted from an access point of a wireless local area network (WLAN); and
responsive to the frame, initiate a communication link with the WLAN;
positioning circuitry configured to determine a location for the device; and
scan circuitry configured to:
responsive to the location, set a proximity bit, the proximity bit representative of the location;
compute a hash function output with an input comprising the proximity bit to produce a timing offset;
responsive to referencing the timing offset against a global clock, perform a prediction of a transmission time for the frame from the access point of the WLAN; and
responsive to the prediction, cause the wireless communication interface to tune the receiver to the channel during the transmission time.

20. The device of claim 19, wherein the scan circuitry is further configured to:
determine a randomization bit responsive to the location, the randomization bit representative of the location along with the proximity bit; and
omit the randomization bit from the input to the hash function.

* * * * *